United States Patent
Nishi et al.

(10) Patent No.: US 12,080,448 B2
(45) Date of Patent: Sep. 3, 2024

(54) INSULATED ELECTRICAL WIRE AND METHOD OF MANUFACTURING INSULATED ELECTRICAL WIRE

(71) Applicant: PROTERIAL, LTD., Tokyo (JP)

(72) Inventors: Hajime Nishi, Tokyo (JP); Ikumi Ando, Tokyo (JP); Takami Ushiwata, Tokyo (JP); Yuki Honda, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

(21) Appl. No.: 17/935,356

(22) Filed: Sep. 26, 2022

(65) Prior Publication Data
US 2023/0099568 A1  Mar. 30, 2023

(30) Foreign Application Priority Data

Sep. 27, 2021 (JP) .................... 2021-156780
Aug. 8, 2022 (JP) .................... 2022-126336

(51) Int. Cl.
*H01B 7/02* (2006.01)
*H01B 3/30* (2006.01)
*H01B 13/06* (2006.01)

(52) U.S. Cl.
CPC ........... *H01B 7/0225* (2013.01); *H01B 3/306* (2013.01); *H01B 13/06* (2013.01)

(58) Field of Classification Search
None
See application file for complete search history.

(56) References Cited

U.S. PATENT DOCUMENTS

| | | | | |
|---|---|---|---|---|
| 3,567,846 | A | * | 3/1971 | Brorein .............. H01B 11/1839 156/48 |
| 5,210,377 | A | * | 5/1993 | Kennedy ............ H01B 11/1839 174/107 |
| 5,393,929 | A | * | 2/1995 | Yagihashi ................. B32B 1/00 428/319.7 |

(Continued)

FOREIGN PATENT DOCUMENTS

| | | |
|---|---|---|
| JP | 2016091865 A | 5/2016 |
| JP | 2018009117 A | 1/2018 |

(Continued)

OTHER PUBLICATIONS

English Translation of Notice of Reasons for Refusal filed in Japanese Application No. 2021-156780, mailed Jun. 28, 2020, 12 pages.

(Continued)

*Primary Examiner* — Krystal Robinson
(74) *Attorney, Agent, or Firm* — Meunier Carlin & Curfman LLC

(57) ABSTRACT

An insulated electrical wire is provided. The insulated electrical wire includes a conductor and an insulating film including pores. The insulating film at least includes a first insulating layer. The first insulating layer includes a first center region, a first inner side region, and a first outer side region. The first center region is a center region in the first insulating layer in a thickness direction and is formed of an insulating material and first pores that are the pores. The first pores are derived from a liquid thermally decomposable polymer. The first inner side region and the first outer side region are formed not to include the first pores.

9 Claims, 15 Drawing Sheets

(56) References Cited

U.S. PATENT DOCUMENTS

| | | | |
|---|---|---|---|
| 10,319,496 B2 | 6/2019 | Fujimori et al. | |
| 2012/0285724 A1 | 11/2012 | Oya et al. | |
| 2013/0023617 A1 | 1/2013 | Okamoto | |
| 2015/0325333 A1 | 11/2015 | Muto et al. | |

FOREIGN PATENT DOCUMENTS

| | | | | |
|---|---|---|---|---|
| JP | 2018067516 A | 4/2018 | | |
| WO | 2011089878 A1 | 7/2011 | | |
| WO | 2016072425 A1 | 5/2016 | | |
| WO | WO-2018186259 A1 | * | 10/2018 | ............... H01B 7/02 |
| WO | WO-2018230706 A1 | * | 12/2018 | ............. C08G 73/10 |

OTHER PUBLICATIONS

Notification of Reasons for Refusal issued in JP Application No. 2022-126336; dated Nov. 15, 2022; 8 pages.
European Search Report issued in EP Application No. 22197362.1-1202 dated Feb. 13, 2023; 10 pages.

* cited by examiner

| ITEM | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 |
|---|---|---|---|---|---|---|---|
| CONFIGURATION | SINGLE COAT | SINGLE COAT | SINGLE COAT | SINGLE COAT | SINGLE COAT | DOUBLE COATS | TRIPLE COATS |
| PORE DIAMETER [μm] | — | 1 TO 5 | 1 TO 5 | ≤ 2 | ≤ 2 | INNER LAYER: ≤ 2, OUTER LAYER: 1 TO 5 | INNER LAYER, OUTER LAYER: ≤ 2, INTERMEDIATE LAYER: 1 TO 5 |
| ADHESION | ○ | × (BROKEN) | × (BROKEN) | ○ | ○ | ○ | ○ |
| POROSITY OF ENTIRE INSULATING FILM [vol%] | — | 12 | 30 | 12 | 30 | 30 | 30 |
| RELATIVE PERMITTIVITY | × 3.1 | ○ 2.7 | ○ 2.3 | ○ 2.7 | ○ 2.3 | ○ 2.3 | ○ 2.3 |
| STRENGTH OF DIELECTRIC BREAKDOWN [V/μm] | ○ 190 | ○ 195 | × 105 | ○ 235 | ○ 230 | ○ 175 | ○ 190 |

FIG. 6

INSULATED ELECTRICAL WIRE AND METHOD OF MANUFACTURING INSULATED ELECTRICAL WIRE

CROSS-REFERENCE TO RELATED APPLICATIONS

This application claims priority to Japanese Patent Application No. 2021-156780 filed on Sep. 27, 2021, and Japanese Patent Application No. 2022-126336 filed on Aug. 8, 2022, the disclosures of which are incorporated herein by reference in their entireties.

BACKGROUND

The present disclosure relates to an insulated electrical wire and a method of manufacturing the insulated electrical wire.

An insulated electrical wire has been known in which an insulating film is provided on a circumferential surface of a conductor formed in an elongated shape. Examples of applications of the insulated electrical wire include a coil for an industrial motor and the like. With the industrial motor, in a case where an output is required, a high voltage may be applied for providing a high output, compared with a case where the output is not required.

Inverter drive is known as a method of controlling a motor rotation speed. With the inverter drive, an inverter surge (hereinafter, may be also referred to as a surge voltage) due to switching or the like may be applied to a motor.

In the inverter drive, the voltage or frequency of an AC power supply applied to the motor is changed using an inverter. The rotation speed of the motor is controlled by controlling the voltage or frequency of the AC power supply applied.

The inverter includes an element such as a semiconductor having an on/off function (also referred to as a switching function). The voltage or frequency of the AC power supply applied is controlling through the switching of this element.

Due to pulses formed by the switching described above, each pulse involves the inverter surge. Such an inverter surge is reflected at a discontinuous point of impedance in a propagation system, and the voltage of the inverter surge can be about twice the output voltage from the inverter at maximum.

SUMMARY

When a relatively high voltage is applied to the insulated electrical wire as described above, partial discharge may occur in an insulating film of the insulated electrical wire used for a coil of a motor. When the partial discharge occurs, the insulating film is eroded, leading a problem of insulation failure.

An example of a solution to this problem includes a method of using, for the insulated electrical wire, an insulating film with a relatively low relative permittivity (hereinafter, also referred to as εr). The use of the insulating film with a relatively low relative permittivity results in a high partial discharge start voltage, whereby the occurrence of the partial discharge can be suppressed.

International Publication WO 2016/072425 and Japanese Unexamined Patent Application Publication No. 2016-091865 are examples of prior art documents disclosing a method of setting a low relative permittivity of the insulating film. These prior art documents disclose a method with which pores (εr=1.0) including gas such as air are dispersed inside the insulating film where the relative permittivity is low. With the pores dispersed, heat resistance can be maintained, while achieving the low relative permittivity effect of making the relative permittivity of the insulating film low. A known insulating film is formed of a polyimide (also referred to as PI) material.

By increasing the percentage of the pores contained in the PI material, the relative permittivity of the insulating film can be reduced. The value of the relative permittivity can be estimated from the percentage of the pore volume (also referred to as porosity) included in the PI material per unit volume.

The technique of dispersing the pores is applied to an enameled wire (also referred to as a PI enameled wire) including the insulating film formed of the PI material. For example, a porous PI enameled wire provided with a large number of pores having a pore diameter of several μm has been known.

For winding for an electric vehicle motor, an enameled wire including an insulating film with a low relative permittivity such as a porous PI enameled wire is used. Enameled wires applied to winding for electric vehicle motors are required to have processability and insulation properties.

When the porous PI enameled wire above has the insulating film formed of the PI material and includes a large number of pores having a pore diameter of about several μm as described about, a plurality of the pores adjacent to each other may communicate with each other. The pore as a result of the communication has a larger pore diameter than other independent pores not communicating with other pores.

The communicating pores are likely to result in a lower dielectric breakdown voltage of the enameled wire, which is likely to lead to a lower processability (for example, the insulating film cracks when the enameled wire is processes to be bent). The lower dielectric breakdown voltage is a result of partial discharge occurring in the communicating pores and the like when the conductor of the enameled wire is energized. The lower processability is a result of compromised strength of the insulating film due to the pores communicating with each other.

In addition to the above problem, there is also a problem in that adhesion between the conductor of the enameled wire and the insulating film is compromised. The compromised adhesion is a result of a reduction in a contact area between the conductor and the insulating film, as a result of the pores opening in a surface of the insulating film in contact with the conductor.

Insufficient adhesion between the conductor and the insulating film may lead to the insulating film peeled from the conductor in a die to clog in the die when the enameled wire is manufactured. This may result in disconnection.

An aspect of the present disclosure provides an insulated electrical wire that has the conductor and the insulating film adhered favorably, and can be applied to a part that is processed such as winding for an electric vehicle motor, and to a method of manufacturing the insulated electrical wire.

One aspect of the present disclosure provides the following configuration.

An insulated electrical wire according to one aspect of the present disclosure includes: a conductor; and an insulating film including pores, in which the insulating film at least includes one first insulating layer that is adjacent to the conductor and covers circumference of the conductor, the first insulating layer includes a first center region, a first inner side region, and a first outer side region, the first center region is a center region in a thickness direction of the first insulating layer and is formed of an insulating material and a plurality of first pores that are the pores, the first inner side region is a region that is closer to the conductor side than the first center region in the thickness direction and is formed of an insulating resin, the first outer side region is a region that is opposite to the conductor relative to the first center region in the thickness direction and is formed of an insulating resin, and the first inner side region and the first outer side region are formed not to include the first pores.

With the insulated electrical wire according to one aspect of the present disclosure, the first inner side region in the first insulating layer of the insulating film is formed of an insulating material and includes no first pores. Thus, the contact area between the conductor and the insulating film is less likely to be reduced, compared with a case where pores are in the contact surface with the conductor. In other words, the adhesion between the conductor and the insulating film including the pores is less likely to decrease.

In the insulated electrical wire according to one aspect of the present disclosure, the first inner side region and the first outer side region are formed of an insulating material and include no first pores. Thus, a phenomenon of the communication between the plurality of first pores across the first inner side region and the first outer side region is less likely to occur. In other words, the breakdown voltage is less likely to be reduced, and the processability is less likely to be deteriorated.

In the insulated electrical wire according to one aspect of the present disclosure, the first center region of the first insulating layer in the insulating film includes the plurality of first pores. The second inner side region of the second insulating layer includes the plurality of second pores. Thus, the relative permittivity of the insulating film can be easily reduced, compared with a case where neither the first pores nor the second pores are included.

Since the surface of the pores has no shell, excellent flexibility is achieved and the insulating film is less likely to be cracked, compared with a technique of providing a polymer shell on the surface of the pores described above to suppress the deterioration of the processability. For example, even when bending processing is performed for the use as the winding for a motor, the insulating film is less likely to crack.

The insulated electrical wire and a method of manufacturing the insulated electrical wire according to the present disclosure have the following effects: the insulated electrical wire can be applied to a part that is processed such as winding for an electric vehicle motor, and defects are likely to be suppressed.

BRIEF DESCRIPTION OF THE DRAWINGS

Example embodiments of the present disclosure will be described hereinafter with reference to the accompanying drawings, in which:

FIG. 6 is a table for comparing evaluation results of insulated electrical wires according to Examples and evaluation results of Comparative Examples;

DETAILED DESCRIPTION OF EXEMPLARY EMBODIMENTS

First Embodiment

An insulated electrical wire 10 according to a first embodiment of the present disclosure and a method of manufacturing the insulated electrical wire 10 will be described below with reference to FIG. 1 to FIG. 6. In the present embodiment, an example is described in which the insulated electrical wire 10 is an enameled wire, specifically, an enameled wire used for winding for a motor. More specifically, in the described example, the insulated electrical wire 10 is an enameled wire used for winding for a driving motor for electric cars such as a hybrid electric vehicle (HEV), an electric vehicle (EV), and a plug-in hybrid electric vehicle (PHEV).

Figure 1:
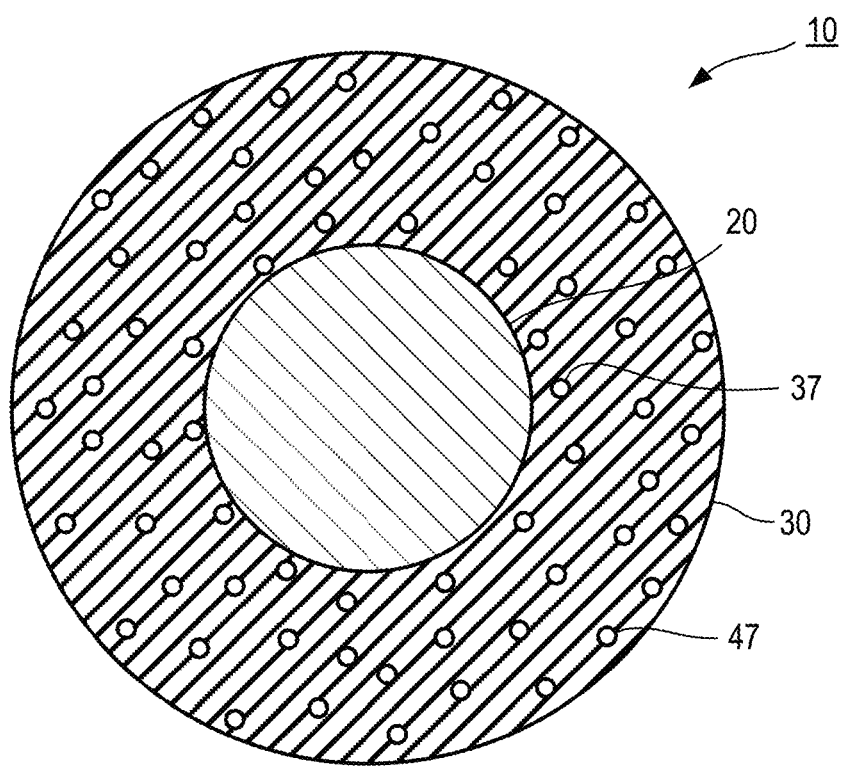
FIG. 1 is a lateral cross-sectional view illustrating a configuration of an insulated electrical wire according to a first embodiment.

FIG. 1 is a lateral cross-sectional view illustrating a configuration of the insulated electrical wire 10 of the present embodiment. As illustrated in FIG. 1, the insulated electrical wire 10 is provided with a conductor 20 and an insulating film 30 including pores.

The conductor 20 is a member extending to be in an elongated shape and having a circular cross-sectional shape. In the example described in the present embodiment, the conductor 20 is a round copper wire having a diameter of 0.8 mm. The cross-sectional shape of the conductor 20 is not limited to a specific shape, and may be circular or rectangular.

The conductor 20 is formed using a metal material generally used for an electrical wire. Examples of the metal material used for forming the conductor 20 may include copper, an alloy including copper, aluminum, or an alloy including aluminum. In the example described in the present embodiment, the conductor 20 is formed of low-oxygen copper with the oxygen content being not larger than 30 ppm, or oxygen-free copper.

The insulating film 30 is a member that covers the circumferential surface of the conductor 20. The insulating film 30 is formed using a material having insulating and thermosetting properties (that is, insulating material). For example, the material having insulating and thermosetting properties may be polyimide or polyamideimide.

In the example described in the present embodiment, the insulating film 30 is formed of wholly aromatic polyimide (hereinafter, also simply referred to as polyimide). A specific method for forming the insulating film 30 will be described below.

Figure 2:
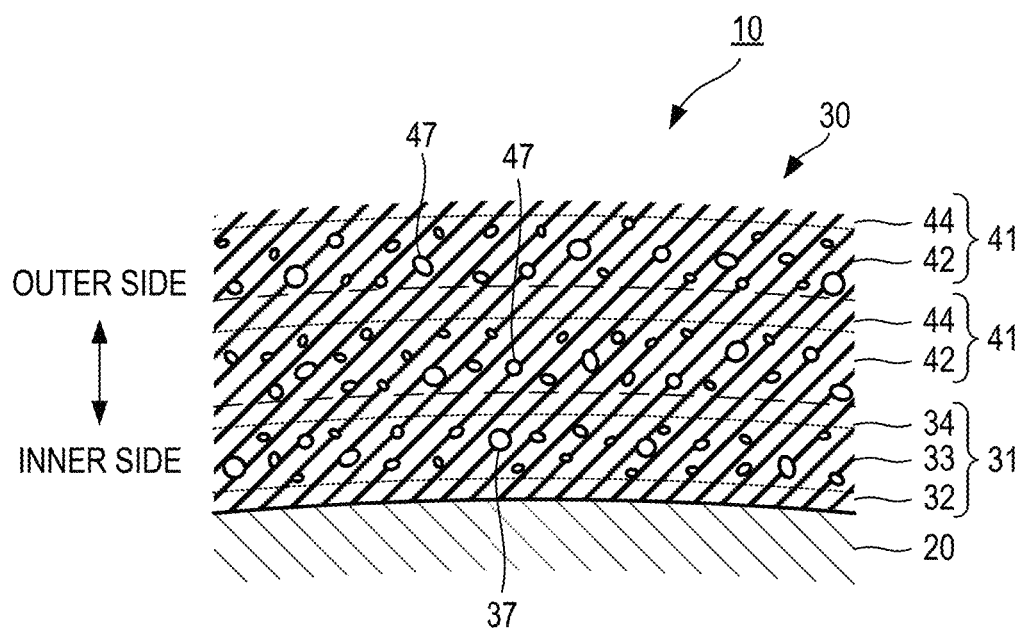
FIG. 2 is a schematic view illustrating configurations of a first insulating layer and second insulating layers in FIG. 1.

FIG. 2 is a schematic view illustrating configurations of a first insulating layer 31 and second insulating layers 41.

As illustrated in FIG. 2, the insulating film 30 is provided with one first insulating layer 31 and a plurality of second insulating layers 41. In the example described in the present embodiment, 14 second insulating layers 41 are provided. The number of the second insulating layers 41 may be more than or less than 14.

In the example described in the present embodiment, the insulating film 30 is entirely formed of the 15 insulating layers, and has a thickness of about 40 µm. The thickness of the insulating film 30 may be larger than or smaller than 40 µm. For example, the thickness of the insulating film 30 is 10 µm or more and 200 µm or less. The number of insulating layers forming the insulating film 30 may be more than or less than 15.

As illustrated in FIG. 2, the first insulating layer 31 is disposed at a position to be adjacent to the outer circumferential surface of the conductor 20. The first insulating layer 31 is a layer formed to cover the circumference of the conductor 20, and is a layer including three regions described below.

The first insulating layer 31 includes a first inner side region 32, a first center region 33, and a first outer side region 34 in this order from the inner side toward the outer side. In the description below, the conductor 20 side and the circumferential surface side, in the thickness direction of the insulating film 30 (also referred to as an upper and lower direction in FIG. 2) are respectively referred to as an inner side and outer side. The first insulating layer 31 is a layer obtained by applying a first coating material described below on the outer circumferential surface of the conductor and baking (thermal curing) the first coating material thus applied. For example, the thickness of the first insulating layer 31 is 1 µm or more and 5 µm or less.

The first inner side region 32 is a region disposed to be in contact with the conductor 20. The first inner side region 32 is a region of the first insulating layer 31 closer to the conductor 20 than the first center region 33, and is formed of an insulating resin such as polyimide. The first inner side region 32 is a region not including first pores 37 described below (hereinafter, is also referred to as a first inner side pore free region). The first center region 33 is a center region in the first insulating layer 31, and is disposed adjacent to the first inner side region 32. The first center region 33 is a region formed of an insulating resin such as polyimide and a plurality of the first pores 37 (hereinafter, also referred to as a first pore region). The first outer side region 34 is a region closer to the second insulating layer 41 than the first center region 33 in the first insulating layer 31, and is disposed adjacent to the first center region 33. The first outer side region 34 is a region that is formed of an insulating resin such as polyimide and does not include the first pores 37 (hereinafter, also referred to as a first outer side pore free region).

The first pores 37 are each a space including gas inside. The gas includes air, a gas produced when a thermally decomposable polymer described below is decomposed, and the like. The gas included inside the first pore 37 should mainly be air. The pore diameter of the first pore 37 is 2 µm or less.

The pore diameter is a diameter in a case where the space is spherical, is a diameter along the major axis in a case of a spheroid obtained by rotating an ellipse about its axis, and is the longest length in a case of other three-dimensional shapes.

The pore diameter is a diameter or a length of one independent first pore 37. The pore diameter of the first pore 37 is not defined for a space as a result of a plurality of first pores 37 being connected in a process of forming the first insulating layer 31, or a space as a result of a plurality of first pores 37 being connected after the first insulating layer 31 has been formed.

The thicknesses of the first inner side region 32 and the first outer side region 34 along the thickness direction of the insulating film 30 are preferably larger than the pore diameter of the first pore 37 included in the first center region 33. With this configuration, the communication between the pores described below is less likely to occur, and the adhesion at an interface between the conductor 20 and the first insulating layer 31 can be improved. The thickness of the first center region 33 is preferably larger than the thickness of the first inner side region 32 and the thickness of the first outer side region 34. With this configuration, the relative permittivity of the insulating film 30 can be easily reduced.

For example, one independent first pore 37 may be something only having an outwardly bulging continuous curved surface shape as in a case where the inner wall of the first pore 37 forms a sphere or a spheroid. For example, the plurality of first pores 37 connected to each other may be something having a shape different from the outwardly bulging curved surface shape formed of the inner wall of the first pore 37.

The second insulating layer 41 is a layer that is disposed on the outer circumferential side of the first insulating layer 31 and covers the conductor 20 and the circumference of the first insulating layer 31. The second insulating layer 41 includes a second inner side region 42 and a second outer side region 44 in this order from the inner side toward the outer side.

The second inner side region 42 is a region of the second insulating layer 41 on the first insulating layer 31 side, and is formed of polyimide and a plurality of second pores 47 (hereinafter, also referred to as a second pore region). The second outer side region 44 is a region positioned adjacent to the second inner side region 42, is a region on the outer side that is opposite to the first insulating layer 31, and is a region formed of polyimide (hereinafter, also referred to as a second outer side pore free region). The pore diameter of each of the second pores 47 is 2 µm or less.

Preferably, the thickness of the second outer side region 44 along the thickness direction of the insulating film 30 is larger than the pore diameter of the second pore 47 included in the second inner side region 42. With this configuration, the communication between the pores in the second insulating layer 41 described layer described below is less likely to occur (hereinafter, also referred to as communication between pores through layers). Preferably, the thickness of the second inner side region 42 is larger than the thickness of the second outer side region 44. With this configuration, the relative permittivity of the insulating film 30 can be easily reduced.

Figure 3:
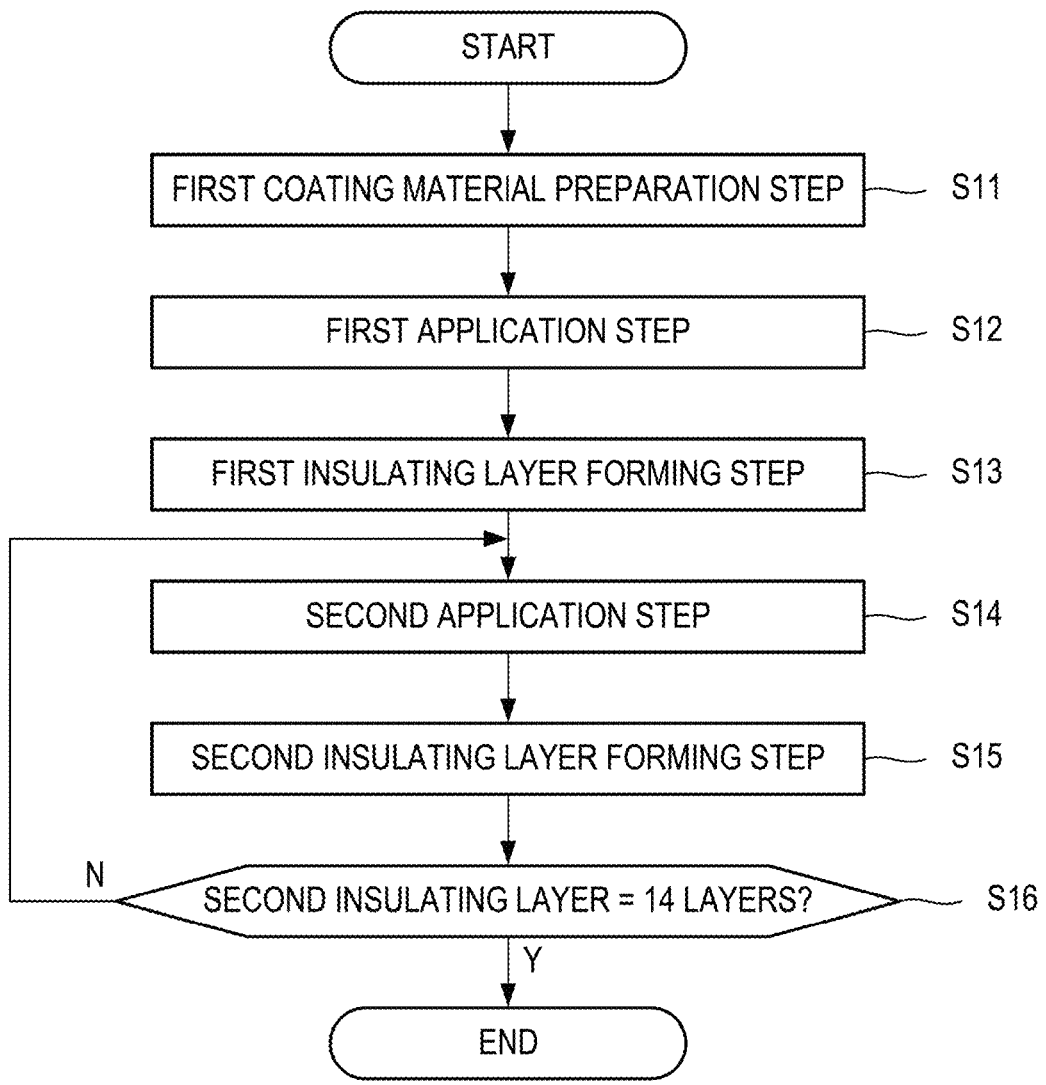
FIG. 3 is a flowchart illustrating a method of manufacturing the insulated electrical wire in FIG. 1.

Next, a method of manufacturing the insulated electrical wire 10 described above will be described with reference to FIG. 3. Specifically, a method of manufacturing the insulating film 30 in the insulated electrical wire 10 will be described. FIG. 3 is a flowchart illustrating the method of manufacturing the insulated electrical wire 10.

First of all, a step of preparing the first coating material for forming the insulating film 30 of the insulated electrical wire 10 is performed (S11). Specifically, a step of stirring and synthesizing polyamic acid in a solvent is performed. The coating material before the stirring and synthesizing (also referred to as a pre-synthesis coating material) has the solvent including polyimide monomer that is a resin content including a diamine and a tetracarboxylic dianhydride. A step to obtain the first coating material containing the polyamic acid is performed in which, after a foaming agent composed of a thermally decomposable polymer is added at a ratio of a specific part by weight to the resin content of the pre-synthesis coating material, the polyimide monomer in the pre-synthesis coating material is stirred and mixed in the solvent. The foaming agent foams in the coating material, whereby the pores are formed in the insulating film 30.

The foaming agent made of the thermally decomposable polymer is added in an amount of, for example, 10 parts by weight (phr: per hundred resin) or more and 60 parts by weight or less (this corresponds to a specific part by weight) based on the resin content in the coating material before the stirring and synthesizing.

The polyamic acid is a precursor of polyimide, which is an insulating material with which the insulating film 30 is formed. As the polyamic acid, any kind of material used in the manufacturing of known enameled wires can be used, and a specific kind is not specified.

In the example described in the present embodiment, the polyamic acid is obtained by polymerizing a diamine and a tetracarboxylic dianhydride.

As the diamine, 1,4-bis(4-aminophenoxy)benzene (TPE-Q), 1,3-bis(4-aminophenoxy)benzene (TPE-R), 1,3-bis(3-aminophenoxy)benzene (APB), 4,4'-bis(4-aminophenoxy) biphenyl (BODA), 4,4'-diaminodiphenyl ether (ODA), and the like can be used. In the example described in the present embodiment, the diamine is a wholly aromatic polyimide essentially containing 4,4'-diaminodiphenyl ether (ODA).

As the tetracarboxylic dianhydride, 3,3',4,4'-benzophenone tetracarboxylic dianhydride (BTDA), 3,3',4,4'-diphenylsulfone tetracarboxylic dianhydride (DSDA), 4,4'-oxydiphthalic dianhydride (ODPA), 4,4'-(2,2-hexafluoroisopropylidene) diphthalic anhydride (6FDA), pyromellitic dianhydride (PMDA), 3,3',4,4'-biphenyltetracarboxylic dianhydride (BPDA), and the like can be used. In the example described in the present embodiment, the tetracarboxylic dianhydride is a wholly aromatic polyimide essentially containing pyromellitic dianhydride (PMDA).

The polyimide constituting the insulating film 30 obtained by imidizing the polyamic acid described above may be the one with the end portion of the polymer capped. As the material used for capping, a compound containing an acid anhydride or a compound containing an amino group may be used.

As the compound containing an acid anhydride used for capping, phthalic anhydride, 4-methylphthalic anhydride, 3-methylphthalic anhydride, 1,2-naphthalic anhydride maleic anhydride, 2,3-naphthalene dicarboxylic anhydride, various types of fluorinated phthalic anhydrides, various types of brominated phthalic anhydrides, various types of chlorinated phthalic anhydrides, 2,3-anthracene dicarboxylic anhydride, 4-ethynylphthalic anhydride, 4-phenylethynylphthalic anhydride, and the like can be used.

As the compound containing an amino group used for capping, a compound containing a single amino group may be used.

As the solvent, NMP (N-methylpyrrolidone), DMAc (dimethylacetamide), and the like can be used. In the example described in the present embodiment, DMAc is used as the solvent.

Examples of the thermally decomposable polymer used for the foaming agent include a liquid thermally decomposable polymer. As the liquid thermally decomposable polymer, for example, a diol type polypropylene glycol having hydroxyl groups at both ends and the like can be used. When the liquid thermally decomposable polymer is used as the foaming agent, the thermally decomposable polymer is compatible with a coating material containing polyamic acid via a solvent. When a thermally decomposable polymer composed of fine particles is used as the thermally decomposable polymer, the thermally decomposable polymer is not compatible with a coating material containing polyamic acid, and the fine particulate thermally decomposable polymer is dispersed in the coating material containing the polyamic acid. The liquid thermally decomposable polymer excellent in compatibility with a coating material containing polyamic acid can take a state in which the thermally decomposable polymer and the polyamic acid are phase-separated while the coating material is heated and the solvent is volatilized. The phase-separated liquid thermally decomposable polymer is thermally decomposed to form the first pores 37 described below in the first insulating layer 31. With the pores formed through such a process, the first insulating layer 31 not including the first pores 37 is expected to be formed at the interface with the conductor 20. In particular, when the diol type polypropylene glycol is used as the liquid thermally decomposable polymer, compatibility with a coating material containing polyamic acid is further enhanced, so that the effect is further remarkable. In the example described in the present embodiment, a diol type polypropylene glycol (also referred to as PPG 400) having a molecular weight of 400 is used as the liquid thermally decomposable polymer.

Next, a first application step of applying the prepared first coating material around the conductor 20 is performed (S12). Specifically, an operation of applying the first coating material for forming the first insulating layer 31 is performed. An applied coating material, obtained by applying the first coating material once, is formed on the circumferential surface of the conductor 20.

The first coating material is applied to make the first insulating layer 31 have a desired thickness that is about 3 μm, for example, after a first insulating layer forming step subsequently performed. In the example described in the present embodiment, the applied coating material having a desired thickness is formed around the conductor 20 by using a die.

The die described above has a through hole into which the conductor 20 on which the applied coating material is formed is inserted. After the applied coating material formed of the first coating material having a larger thickness than the desired thickness of the first insulating layer 31 is formed around the conductor 20, the conductor 20 is inserted into the through hole of the die. The die removes part of the outer circumferential portion of the applied coating material, so that the applied coating material with a thickness corresponding to the outer diameter of the through hole remains around the conductor 20.

A method of applying the first coating material around the conductor 20 is not limited to the method described above, and other known application methods used for manufacturing enameled wires can be used.

Next, the first insulating layer forming step of forming the first insulating layer 31 by heating the applied coating material formed by applying the first coating material once around the conductor 20 is performed (S13). Specifically, the conductor 20 on which the first coating material is applied once is placed in a furnace maintained within a range from 300° C. to 500° C.

In the furnace, the solvent is removed, by high temperature, from the applied coating material formed of the first coating material. Thereafter, imidization reaction of the polyamic acid included in the applied coating material proceeds in a state where the thermally decomposable polymer and the polyamic acid are phase-separated. As a result, the first insulating layer 31 is formed. Thermal decomposition of the thermally decomposable polymer serving as the foaming agent occurs while the imidization reaction of the polyamic acid is occurring, whereby the first pores 37 are formed in the first insulating layer 31. Thus, the first pores 37 derived from the liquid thermally decomposable polymer are formed in the first insulating layer 31.

In the present embodiment, attachability of the liquid thermally decomposable polymer, used as the foaming agent, relatively to the conductor 20 (hereinafter, also referred to as wettability or affinity) is lower than that to the polyamic acid. Thus, the percentage of the thermally decomposable polymer serving as the foaming agent included in the portion corresponding to the first center region 33 and the first outer side region 34 is expected to be higher than that in a portion corresponding to the first inner side region 32 in the first coating material.

In other words, the percentage of the thermally decomposable polymer serving as the foaming agent included in the portion corresponding to the first inner side region 32 is expected to be small. Thus, the first inner side region 32 of the first insulating layer 31 is formed of polyimide, which is an insulating resin, and includes no first pores 37 described below.

As described above, the percentage of the thermally decomposable polymer serving as the foaming agent included is high in the portion corresponding to the first outer side region 34 in the applied coating material. On the other hand, the thermally decomposable polymer heated to be decomposed and vaporized is expected to be released from the applied coating material before the polyamic acid turns into polyimide through the imidization. Thus, the first outer side region 34 of the first insulating layer 31 is formed of polyimide, which is an insulating resin, and includes no first pores 37 described below.

In the portion corresponding to the first center region 33 in the applied coating material, the polyamic acid is expected to turn into polyimide through imidization, before the vaporized thermally decomposable polymer is released from the applied coating material. Thus, the first center region 33 of the first insulating layer 31 is formed of the polyimide, which is an insulating resin, and the plurality of first pores 37.

Next, a second application step of applying the prepared first coating material around the first insulating layer 31 is performed (S14). Specifically, an operation of applying the first coating material for forming the second insulating layer 41 on the circumferential surface of the first insulating layer 31 is performed. The applied coating material formed of the first coating material is formed around the first insulating layer 31.

The first coating material is applied to make the second insulating layer 41 have a desired thickness that is about 3 μm, for example, after a second insulating layer forming step subsequently performed. The thickness of the applied coating material is adjusted using a die as in the first application step S12. The die used in the step has a through hole corresponding to the outer diameter of the conductor 20 having the first insulating layer 31 formed on the circumferential surface.

A method of applying the first coating material around the first insulating layer 31 is not limited to the method described above, and other known application methods used for manufacturing enameled wires can be used.

Next, the second insulating layer forming step of forming the second insulating layer 41 by heating the applied coating material after the first coating material is applied is performed (S15). Specifically, in the second insulating layer forming step S15, the conductor 20 and the first insulating layer 31 on which the applied coating material is formed by the application of the first coating material are placed in the furnace maintained within a range from 300° C. to 500° C., as in the first insulating layer forming step.

In the second insulating layer forming step S15, the solvent is removed, by the high temperature in the furnace, from the applied coating material formed of the first coating material, as in the first insulating layer forming step S13. Thereafter, imidization reaction of the polyamic acid included in the applied coating material proceeds in a state where the polyamic acid and the thermally decomposable polymer are phase-separated. As a result, the second insulating layer 41 is formed. Thermal decomposition of the thermally decomposable polymer serving as the foaming agent occurs while the imidization reaction of the polyamic acid is occurring, whereby the second pores 47 are formed in the second insulating layer 41. Thus, the second pores 47 derived from the liquid thermally decomposable polymer are formed in the second insulating layer 41.

The second insulating layer forming step S15 is different from the first insulating layer forming step S13 in that the applied coating material formed of the first coating material formed on the circumferential surface of the first insulating layer 31 is in contact with the first insulating layer 31 and not with the conductor 20. Thus, the applied coating material formed in the second application step S14 is expected to have the thermally decomposable polymer serving as the foaming agent relatively uniformly provided, compared with the applied coating material formed in the first application step S12.

In a portion corresponding to the second outer side region 44 in the second insulating layer 41 in the applied coating material, the thermally decomposable polymer decomposed and vaporized by heating is expected to be released before the polyamic acid turns into polyimide through imidization. Thus, the second outer side region 44 is formed of polyimide, which is an insulating resin, and includes no second pores 47.

In the portion corresponding to the second inner side region 42 in the applied coating material, the polyamic acid is expected to turn into polyimide through imidization, before the vaporized thermally decomposable polymer is released from the applied coating material. Thus, the second inner side region 42 is formed of the polyimide, which is an insulating resin, and the plurality of second pores 47.

After the second insulating layer forming step S15, when the number of second insulating layers 41 formed has not reached 14 (NO in S16), the process returns to the second application step S14 described above, and the step of forming the second insulating layer 41 is repeated. When the number of second insulating layers 41 formed has reached 14 (YES in S16), the process of forming the insulating film 30 around the conductor 20 ends.

In other words, a set of the second application step S14 and the second insulating layer forming step S15 is performed 14 times, whereby 14 second insulating layers 41 are formed. Specifically, in the second application step S14 performed for the second time and after, the first coating material is applied around the second insulating layer 41 to form the applied coating material around the second insulating layer 41. In the second insulating layer forming step S15 performed for the second time and after, the applied coating material formed around the second insulating layer 41 is heated to form the second insulating layer 41 around the second insulating layer 41. Thus, the insulating film 30 of the insulated electrical wire 10 is manufactured. In the insulating film 30 as a whole, a single first insulating layer 31 and 14 second insulating layers 41 are formed. The insulating film 30 formed has a thickness of about 40 μm.

Next, a description will be given on comparison in evaluation results between the above-described insulated electrical wires 10 of Example 1 and Example 2 and those of Comparative Examples, with reference to FIG. 4 to FIG. 6. First of all, a description will be given on Comparative Example 1 (hereinafter, also referred to as an insulated electrical wire 110) and Comparative Examples 2 and 3 (hereinafter, also referred to as an insulated electrical wire 210) used for the comparison.

Figure 4:
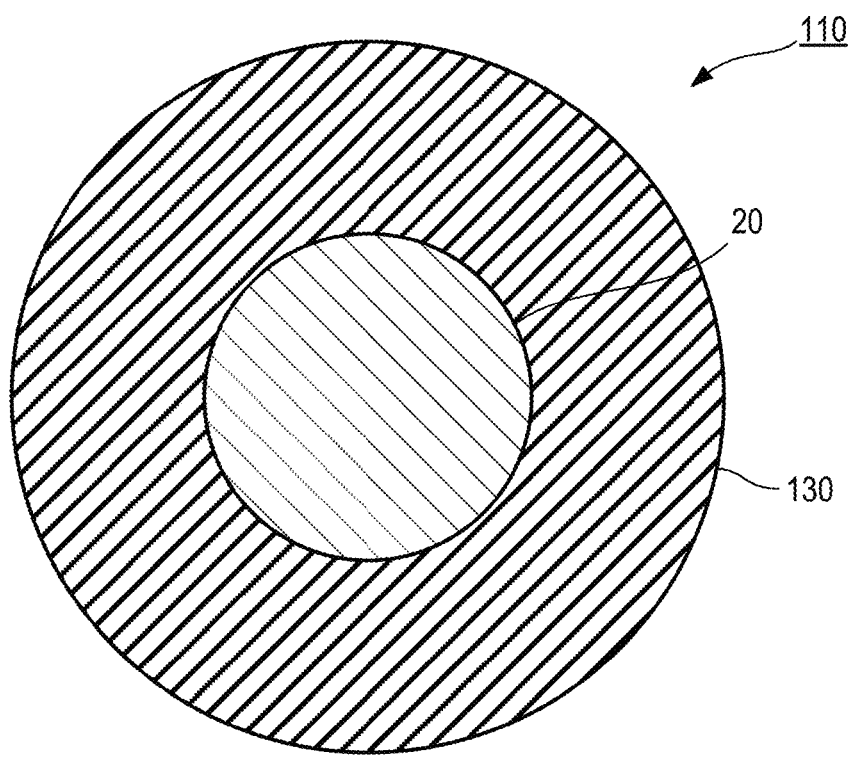
FIG. 4 is a lateral cross-sectional view illustrating a configuration of an insulated electrical wire according to Comparative Example 1.

FIG. 4 is a lateral cross-sectional view illustrating a configuration of the insulated electrical wire 110 according to Comparative Example 1. FIG. 5 is a lateral cross-sectional view illustrating a configuration of the insulated electrical wire 210 according to Comparative Examples 2 and 3.

The insulated electrical wire 110 according to Comparative Example 1 is provided with the conductor 20 and an insulating film 130 as illustrated in FIG. 4. The conductor 20 of the insulated electrical wire 110 has the same composition as the conductor 20 of the insulated electrical wire 10 according to the first embodiment.

The insulating film 130 is a member that covers the circumferential surface of the conductor 20. The insulating film 130 is formed using polyimide, which is an insulating material having insulating and thermosetting properties. Specifically, the insulating film 130 is formed by stacking 15 insulating layers. The insulating layer has a thickness of about 3 μm and has no pores. The insulating film 130 as a whole has a thickness of about 40 μm.

The insulating layers of the insulating film 130 is formed by using a coating material (also referred to as a coating material containing no foaming agent) obtained by stirring polyamic acid in a solvent. One insulating layer is formed by heating the applied coating material at 300° C. to 500° C. As the polyamic acid and the solvent, the polyamic acid and the solvent used for the insulated electrical wire 10 according to the first embodiment are used.

Figure 5:
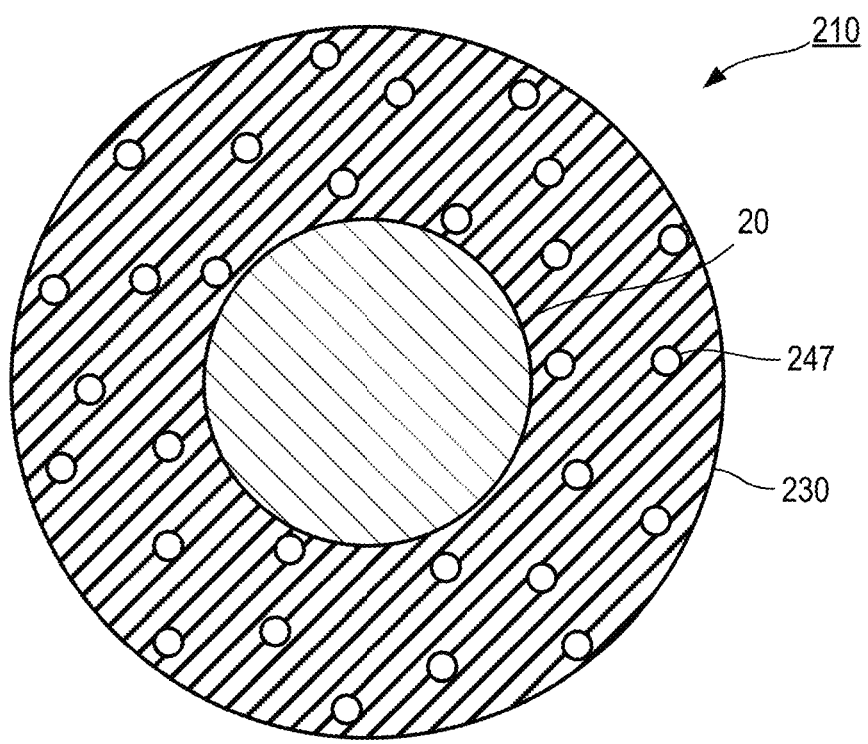
FIG. 5 is a lateral cross-sectional view illustrating a configuration of an insulated electrical wire according to Comparative Examples 2 and 3.

The insulated electrical wire 210 according to Comparative Examples 2 and 3 is provided with the conductor 20 and an insulating film 230 as illustrated in FIG. 5.

The conductor 20 of the insulated electrical wire 210 has the same composition as the conductor 20 of the insulated electrical wire 10 according to the first embodiment.

The insulating film 230 is a member that covers the circumferential surface of the conductor 20. The insulating film 230 is formed using polyimide having insulating and thermosetting properties. Specifically, the insulating film 230 is formed by stacking 15 insulating layers.

The insulating layer has a thickness of about 3 μm and has pores 247. The pore diameter of each of the pores 247 is 1 μm or more and 5 μm or less. The insulating film 230 as a whole has a thickness of about 40 μm.

The insulating layer of the insulating film 230 is formed using a coating material containing polyamic acid obtained by stirring and synthesizing polyimide monomer in a solvent including polyimide monomer and a high-boiling point solvent serving as a foaming agent. To the resin content (=polyimide monomer) of the coating material before the stirring and synthesizing, the high-boiling point solvent of about 15 parts by weight (phr) is added in Comparative Example 2, and of about 30 parts by weight is added in Comparative Example 3. As the high-boiling point solvent serving as the foaming agent, a material the boiling point of which was 280° C. or higher was used.

The 15 insulating layers are formed by heating the applied coating material at 300° C. to 500° C. As the polyamic acid and the solvent, the polyamic acid and the solvent used for the insulated electrical wire 10 according to the first embodiment are used.

In the insulating film 230 of Comparative Examples 2 and 3, one of the 15 insulating layers that is in contact with the conductor 20 has pores included in a region (region corresponding to the first inner side region 32, for example) disposed to be in contact with the conductor 20.

Next, a description will be given on comparison in evaluation results between the above-described insulated electrical wires 10 of Example 1 and Example 2 and those of Comparative Examples, with reference to FIG. 6. FIG. 6 is a table illustrating a plurality of evaluation results.

The insulated electrical wire 10 of Example 1 is manufactured using the first coating material obtained by adding 20 parts by weight of a liquid thermally decomposable polymer (PPG400) to the resin content in the coating material before the stirring and synthesizing. The insulated electrical wire 10 of Example 2 is manufactured using the first coating material obtained by adding 40 parts by weight of a liquid thermally decomposable polymer (PPG400) to the resin content in the coating material before the stirring and synthesizing.

The insulated electrical wire 10 according to Example 1 and Example 2, the insulated electrical wire 110 according to Comparative Example 1, the insulated electrical wire 210 according to Comparative Example 2, and an insulated electrical wire 310 according Comparative Example 3, respectively have the insulating film 30, the insulating film 130, the insulating film 230, and an insulating film 330 formed by using a single type of coating material. Thus, they each have single coat described in a field of configuration in FIG. 6.

In a field of pore diameter in FIG. 6, the pore diameters (2 μm or smaller) of the first pores 37 and the second pores 47 of the insulated electrical wire 10 of Example 1 are described. Furthermore, the pore diameters (2 μm or smaller) of the first pores 37 and the second pores 47 of the insulated electrical wire 10 of Example 2 are described.

For the insulated electrical wire 110 according to Comparative Example 1, no value is described and "-" is described, because it has no pores. Furthermore, the pore diameters (1 μm or more and 5 μm or less) of the pores 247 of the insulated electrical wire 210 according to Comparative Example 2 and the pores 347 of the insulated electrical wire 310 according to Comparative Example 3 are described.

In a field of adhesion in FIG. 6, evaluation results on the adhesion are described. The adhesion is evaluated based on whether the insulated electrical wire breaks during the manufacturing of the insulated electrical wire. More specifically, it is evaluated based on whether the insulating film is peeled when the insulated electrical wire is manufactured, and the peeled insulating film clogs in the die to cause breaking.

The insulated electrical wire 10 of Example 1 did not break, and thus the adhesion thereof was evaluated to be good (○). The insulated electrical wire 10 of Example 2 did not break, and thus the adhesion thereof was evaluated to be good (○). The insulated electrical wire 110 of Comparative Example 1 did not break, and thus the adhesion thereof was evaluated to be good (○). On the other hand, the insulated electrical wire 210 according to Comparative Example 2 and the insulated electrical wire 310 according to Comparative Example 3 were broken, and the adhesion thereof was evaluated to be poor (X).

In a field of porosity of entire insulating film in FIG. 6, a volume percentage (vol %) as an evaluation value of the porosity in the insulating film is described. The porosity of the entire insulating film is evaluated using areometry.

The porosity of the insulated electrical wire 10 of Example 1 is 12 (vol %). The porosity of the insulated electrical wire 10 of Example 2 is 30 (vol %). For the insulated electrical wire 110 according to Comparative Example 1, no value is described and "-" is described, because it has no pores. The porosity of the insulated electrical wire 210 according to Comparative Example 2 is 12 (vol %). The porosity of the insulated electrical wire 310 according to Comparative Example 3 is 30 (vol %).

In a field of relative permittivity in FIG. 6, the measured values and the evaluation results of the relative permittivity are described. The relative permittivity was measured using a four-terminal method under the condition of a frequency of 1 kHz, with silver paste applied to the surface of the insulated electrical wire. The value of the relative permittivity that was less than 3.0 was determined to be good (○), whereas the value of the relative permittivity that was 3.0 or more was determined to be poor (X).

The value of the relative permittivity of the insulated electrical wire 10 of Example 1 was 2.7, and thus determined to be good (○). The value of the relative permittivity of the insulated electrical wire 10 of Example 2 was 2.3, and thus determined to be good (○). The value of the relative permittivity of the insulated electrical wire 110 of Comparative Example 1 was 3.1, and thus determined to be poor (X). The value of the relative permittivity of the insulated electrical wire 210 of Comparative Example 2 was 2.7, and thus determined to be good (○). The value of the relative permittivity of the insulated electrical wire 310 of Comparative Example 3 was 2.3, and thus determined to be good (○).

In a field of strength of dielectric breakdown in FIG. 6, the measured values and the evaluation results of the strength of dielectric breakdown are described. The strength of dielectric breakdown was measured according to JIS C 3216-5 JA 4.2 (b), and obtained by dividing the measured value by the thickness of the insulating film. The value of the strength of dielectric breakdown that was 150 (V/μm) or more was determined to be good (○), whereas the value of the strength of dielectric breakdown that was less than 150 (V/μm) was determined to be poor (X).

The value of the strength of dielectric breakdown of the insulated electrical wire 10 of Example 1 was 235 (V/μm), and thus determined to be good (○). The value of the strength of dielectric breakdown of the insulated electrical wire 10 of Example 2 was 230 (V/μm), and thus determined to be good (○).

The value of the strength of dielectric breakdown of the insulated electrical wire 110 of Comparative Example 1 was 190 (V/μm), and thus determined to be good (○). The value of the strength of dielectric breakdown of the insulated electrical wire 210 of Comparative Example 2 was 195 (V/μm), and thus determined to be good (○). The value of the strength of dielectric breakdown of the insulated electrical wire 310 of Comparative Example 3 was 105 (V/μm), and thus determined to be poor (X).

Figure 7:
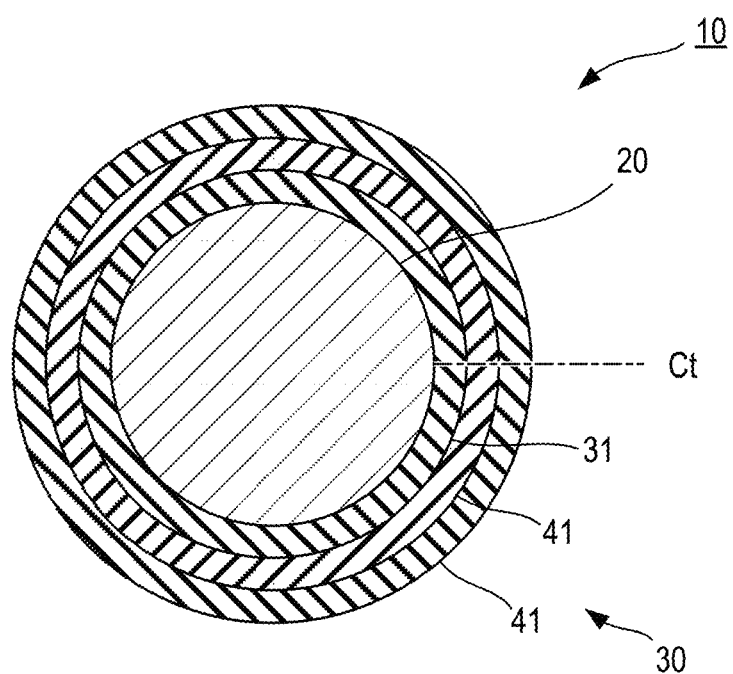
FIG. 7 is a schematic view illustrating a method of preparing the insulating film used for longitudinal cross section observation.
Figure 8:
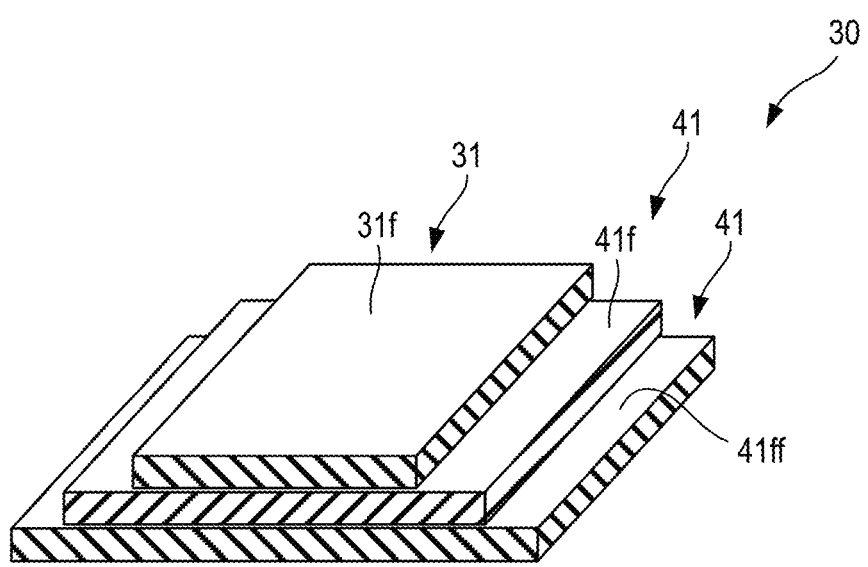
FIG. 8 is a schematic view illustrating a method of preparing the insulating film used for the longitudinal cross section observation.

Next, longitudinal cross section observation results of the interface of the insulating film 30 in the insulated electrical wire 10 described above will be described with reference to FIG. 7 to FIG. 10. FIG. 7 and FIG. 8 are schematic views illustrating a method of preparing the insulating film 30 used for the longitudinal cross section observation.

When the longitudinal cross section is observed, first of all, the insulated electrical wire 10 of Example 1 with a specific length is prepared as an observation target. Next, as illustrated in FIG. 7, the conductor 20 of Example 1 is removed to obtain the insulating film 30 in a cylindrical form. As a method of removing the conductor 20, electrolysis may be employed. The conductor 20 may be removed using a method other than electrolysis.

Next, the cylindrical insulating film 30 is processed into the insulating film 30 in a rectangular film form. Specifically, one cut Ct extending in the longitudinal direction is made in the cylindrical insulating film 30. The longitudinal direction is a direction orthogonal to the paper surface in FIG. 7. The cylindrical insulating film 30 is opened at the cut Ct to be the insulating film 30 in a rectangular film form as illustrated in FIG. 8.

Figure 9:
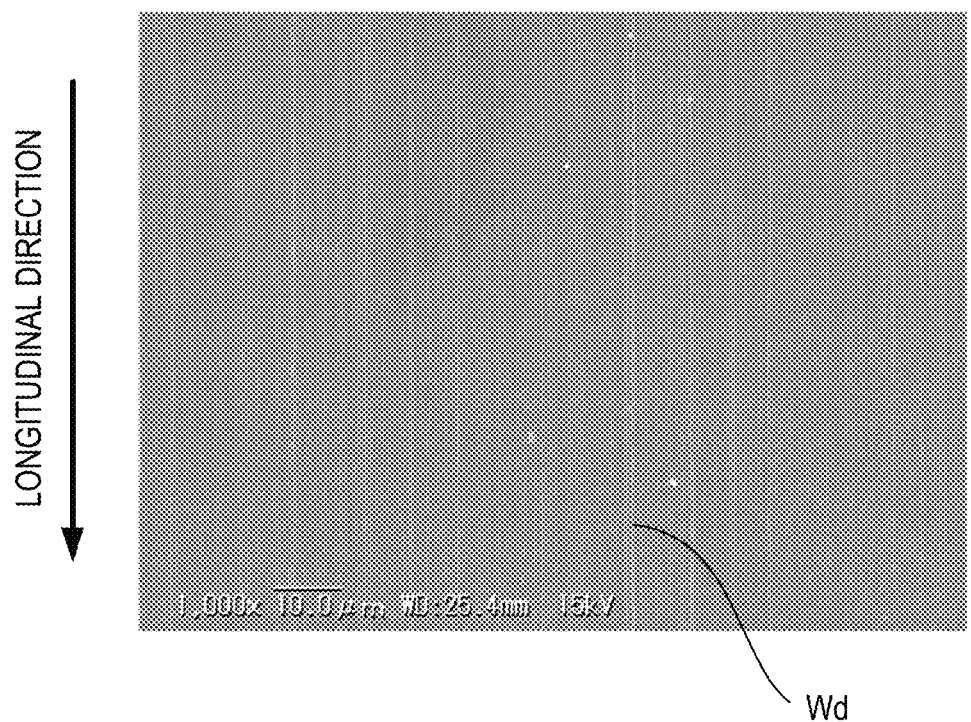
FIG. 9 is an SEM image for explaining an interface adjacent to the conductor in the first insulating layer.

FIG. 9 is an SEM image for explaining an interface adjacent to the conductor 20 in the first insulating layer 31.

No pore is observed on an interface 31f adjacent to the conductor 20 in the first insulating layer 31 as illustrated in FIG. 9. Note that, in FIG. 9, white lines formed in a stripe shape linearly extending in the longitudinal direction of the first insulating layer 31 are traces Wd of recesses and protrusions on the surface of the conductor 20, transferred on the first insulating layer 31.

Figure 10:
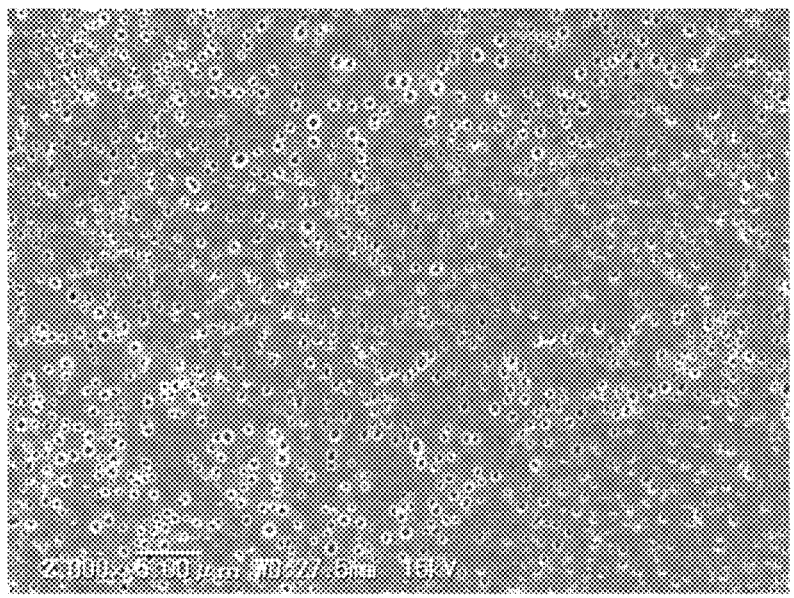
FIG. 10 is an SEM image for explaining an interface adjacent to the first insulating layer in the second insulating layer.

FIG. 10 is an SEM image for explaining an interface adjacent to the first insulating layer 31 in the second insulating layer 41.

As illustrated in FIG. 10, the second pores 47 are observed on an interface 41f adjacent to the first insulating layer 31 in the second insulating layer 41. Circular or elliptical white contour lines in FIG. 10 are the second pores 47 appearing on the interface 41f. The interface 41f is, for example, a surface where the second insulating layer 41 is exposed, as a result of peeling the first insulating layer 31 from the insulating film 30 in a rectangular film form.

While in the present embodiment, the interface 41f adjacent to the first insulating layer 31 in the second insulating layer 41 is observed, an interface 41ff adjacent to the inner side second insulating layer 41 in the outer side second insulating layer 41, out of the two adjacent second insulating layers 41, may be observed.

With the insulated electrical wire 10 having the configuration described above, the first inner side region 32 in the first insulating layer 31 (also referred to as pore including layer) of the insulating film 30 includes no first pores 37. Thus, the contact area between the conductor 20 and the insulating film 30 is less likely to be reduced, compared with a case of an insulating layer having pores in the contact surface with the conductor 20. In other words, while the first insulating layer 31 provided immediately above the conductor 20 is a pore including layer including pores, the adhesion between the conductor 20 and the insulating film 30 is less likely to decrease. As a result, when the insulated electrical wire 10 is manufactured, the insulating film is less likely to be peeled, whereby breaking due to the die clogging is likely to be avoided.

The first inner side region 32 and the first outer side region 34 do not include the first pores 37. Thus, the communication between the plurality of first pores 37 across the first inner side region 32 and the first outer side region 34 is less likely to occur. Thus, with the insulated electrical wire 10, the breakdown voltage is less likely to be reduced, and cracking or the like is less likely to occur in the insulating film 30, even when processing of applying bending or twisting is performed.

The first center region 33 of the first insulating layer 31 in the insulating film 30 includes the plurality of first pores 37. The second inner side region 42 of the second insulating layer 41 includes the plurality of second pores 47. Thus, the relative permittivity of the insulating film 30 of the insulated electrical wire 10 can be easily reduced, compared with a case of an insulating layer not including the first pores 37 or the second pores 47.

The surface of the pores has no shell. Thus, excellent flexibility is achieved and the insulating film 30 is less likely to be cracked, compared with a technique of providing a polymer shell on the surface of the pores described above to suppress the deterioration of the processability. For example, even when bending processing is performed for the use as the winding for a motor, the insulating film 30 is less likely to crack. The insulated electrical wire 10 can be applied to a part that is processed such as the winding for an electric vehicle motor, and defects at the time of such application are likely to be suppressed.

The insulated electrical wire 10 is configured such that the pore diameter of the first pores 37 is 2 μm or less. Thus, partial discharge is less likely to occur, and the strength of dielectric breakdown is easily improved. Here, it is known that when the length (or maximum diameter) of the communicating pores is 8 μm or more, partial discharge is likely to occur. Assuming that a general value of the pore diameter is 4 μm, partial discharge is likely to occur due to communication between at least two pores.

In this context, since the pore diameter of the first pores 37 in the insulated electrical wire 10 is 2 μm or less, partial discharge is not likely to occur unless at least four first pores 37 communicate with each other.

In the insulated electrical wire 10, the thermally decomposable polymer, the attachability of which relatively to the conductor 20 is lower than that to the polyamic acid, is added to the first coating material forming the insulating film 30. Thus, it is possible to form the first insulating layer 31 having the first inner side region 32 formed of polyimide and including no first pore 37 in the portion in contact with the conductor 20 and having the first center region 33 including the plurality of first pores 37 around the first inner side region 32.

The insulated electrical wire 10 includes the diol type polypropylene glycol used as the thermally decomposable polymer added to the first coating material forming the insulating film 30. Thus, the first insulating layer 31 including the first inner side region 32 including no pores and the first center region 33 including the first pores 37 having a pore diameter of 2 μm or less can be formed as an insulating layer in contact with the conductor 20.

With the insulated electrical wire 10, the porosity, the relative permittivity, and the strength of dielectric breakdown of the entire insulating film 30 can be adjusted by changing the component of the coating material forming the insulating film 30.

Specifically, as compared with the insulated electrical wire 10 of Example 1, the thermally decomposable polymer added to the coating material is increased in the insulated electrical wire 10 of Example 2. Thus, the insulated electrical wire 10 of Example 2 can further increase the porosity of the entire insulating film 30. In addition, the relative permittivity can be reduced. In addition, the strength of dielectric breakdown was maintained at 150 (V/μm) or more, which is determined to be good.

Second Embodiment

Next, a second embodiment of the present disclosure will be described with reference to FIG. 11 to FIG. 13. The insulated electrical wire of the present embodiment has the same basic configuration as the first embodiment, but is different from the first embodiment in the configuration of the insulating film. Configurations different from those in the first embodiment will be described, and the description of the same configurations will be omitted.

Figure 11:
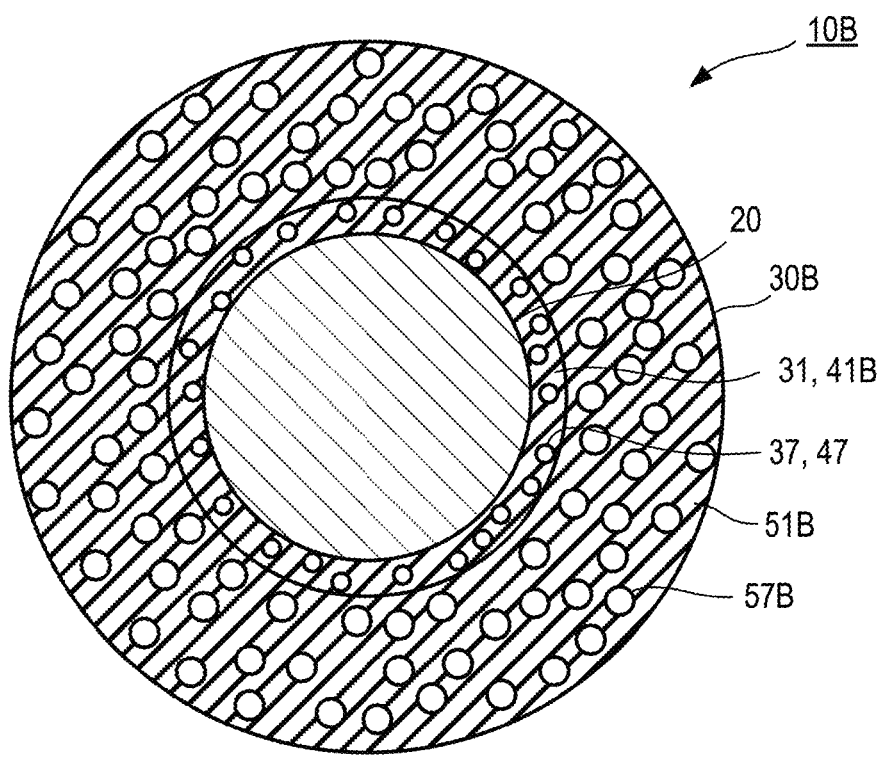
FIG. 11 is a lateral cross-sectional view illustrating a configuration of an insulated electrical wire according to a second embodiment.

FIG. 11 is a lateral cross-sectional view illustrating a configuration of an insulated electrical wire 10B of the present embodiment. As illustrated in FIG. 11, the insulated electrical wire 10B is provided with the conductor 20 and an insulating film 30B. The insulating film 30B is a member that covers the circumferential surface of the conductor 20. The insulating film 30B is formed using a material having insulating and thermosetting properties.

For example, the material having insulating and thermosetting properties may be polyimide or polyamideimide. In the example described in the present embodiment, the insulating film 30B is formed of polyimide.

Figure 12:
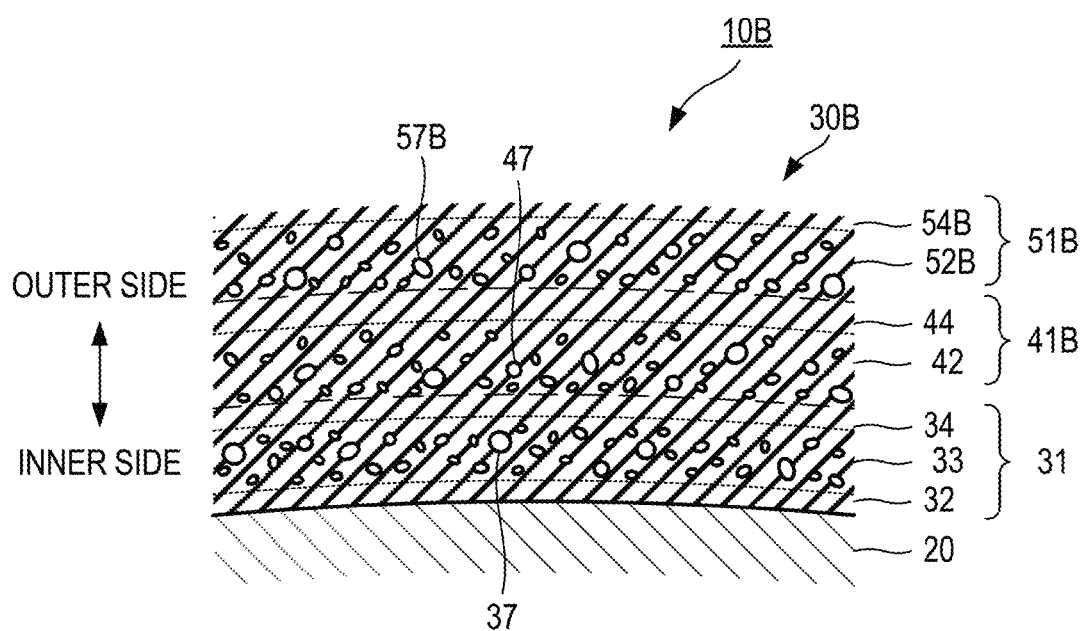
FIG. 12 is a schematic view illustrating configurations of the first insulating layer, a second insulating layer, and a third insulating layer in FIG. 11.
Figure 13:
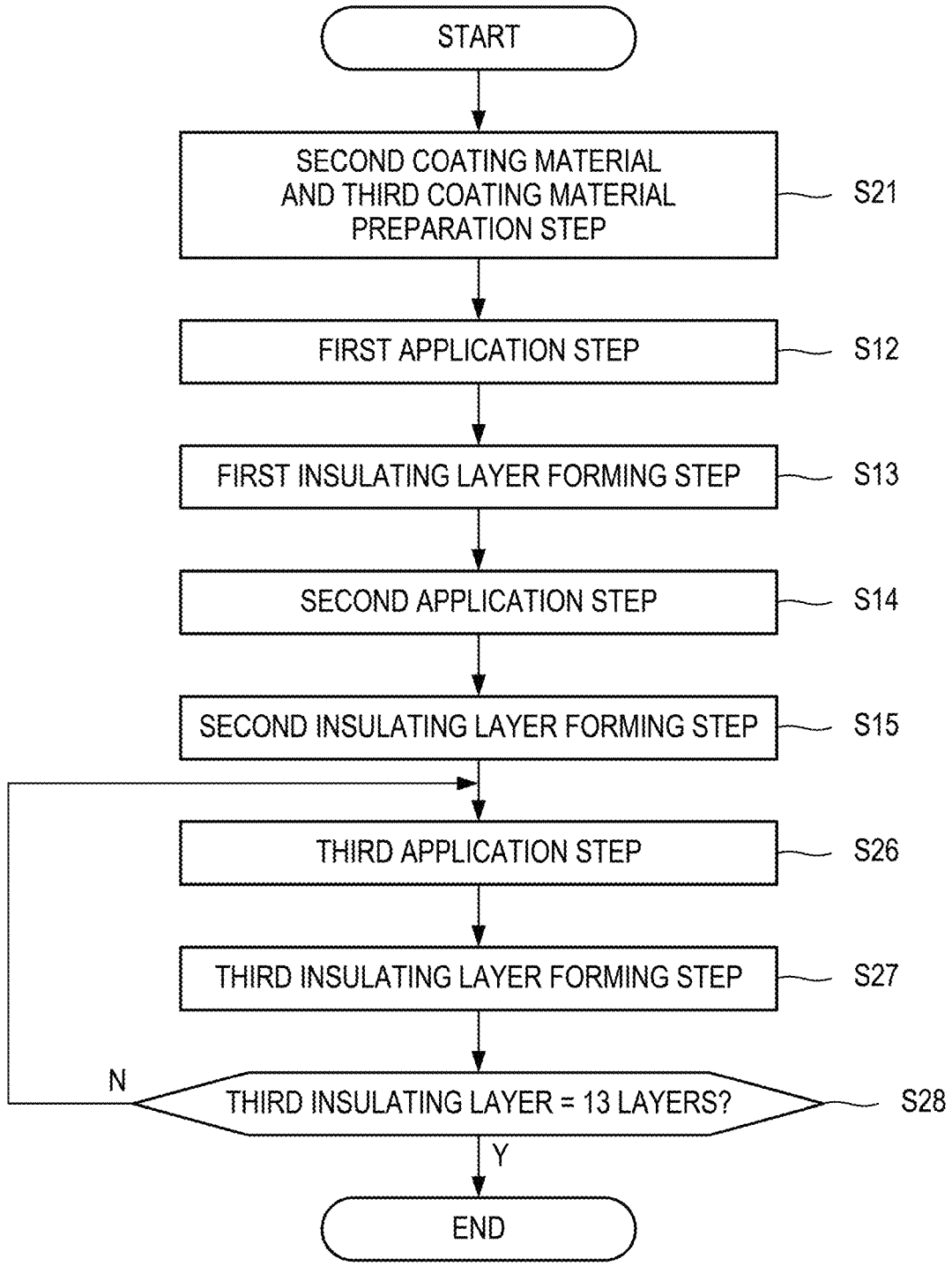
FIG. 13 is a flowchart illustrating a method of manufacturing the insulated electrical wire in FIG. 11.

FIG. 12 is a schematic view illustrating configurations of the first insulating layer 31, a second insulating layer 41B, and a third insulating layer 51B. As illustrated in FIG. 12, the insulating film 30B is provided with one first insulating layer 31 of Example 2, one second insulating layer 41B, and a plurality of third insulating layers 51B. In the example described in the present embodiment, 13 third insulating layers 51B are provided. The number of the third insulating layers 51B may be more than or less than 13.

In the example described in the present embodiment, the insulating film 30B is entirely formed of the 15 insulating layers, and has a thickness of about 40 μm. The thickness of the insulating film 30B may be larger than or smaller than 40 μm. For example, the thickness of the insulating film 30B is 10 μm or more and 200 μm or less.

The second insulating layer 41B is a layer that is disposed on the outer circumferential side of the first insulating layer 31 and covers the conductor 20 and the circumference of the first insulating layer 31. While the number of the second insulating layers 41B is different from that of the second insulating layers 41 of Example 2, the second insulating layer 41B has the same configuration as the second insulating layer 41.

The third insulating layer 51B is a layer that is disposed on the outer circumferential side of the second insulating layer 41B and covers the conductor 20, the first insulating layer 31, and the circumference of the second insulating layer 41B. The third insulating layer 51B includes a third inner side region 52B and a third outer side region 54B, in this order from the inner side toward the outer side.

The third inner side region 52B is a region of the third insulating layer 51B on the second insulating layer 41B side, and is formed of polyimide and a plurality of third pores 57B (hereinafter, also referred to as a third inner side pore region). The third outer side region 54B is a region on the outer side that is opposite to the second insulating layer 41B, and is a region formed of polyimide (hereinafter, also referred to as a third outer side pore free region). The pore diameter of each of the third pores 57B is 1 µm or more and 5 µm or less. Preferably, the thickness of the third outer side region 54B along the thickness direction of the insulating film 30B is larger than the pore diameter of the third pores 57B included in the third inner side region 52B. With this configuration, the communication between the pores in the third insulating layer 51B (hereinafter, also referred to as communication between pores through layers) is less likely to occur. Preferably, the thickness of the third inner side region 52B is larger than the thickness of the third outer side region 54B. With this configuration, the relative permittivity of the insulating film 30B can be easily reduced.

Next, a method of manufacturing the insulated electrical wire 10B described above will be described with reference to FIG. 13. Specifically, a method of manufacturing the insulating film 30B in the insulated electrical wire 10B will be described. FIG. 13 is a flowchart illustrating the method of manufacturing the insulated electrical wire 10B.

First of all, a step of preparing a second coating material and a third coating material for forming the insulating film 30B of the insulated electrical wire 10B is performed (S21). The preparation of the second coating material is the same as the preparation of the first coating material in the first embodiment, and thus the description thereof will be omitted.

In the preparation of the third coating material, a step of stirring and synthesizing polyamic acid in a solvent is performed. A step to obtain the third coating material containing polyamic acid is performed in which the high-boiling point solvent is added to a coating material before the stirring and synthesizing (hereinafter, also referred to as a pre-synthesis coating material) having the solvent including polyimide monomer that is a resin content including a diamine and a tetracarboxylic dianhydride, and the polyimide monomer in the pre-synthesis coating material is stirred and mixed in the solvent. About 30 parts by weight of the high-boiling point solvent is added to the resin content in the coating material before the stirring and synthesizing.

The polyamic acid and the solvent used for the third coating material are the same as those used the first embodiment. As the high-boiling point solvent, a material the boiling point of which is 280° C. or higher is used. Examples of the high-boiling point solvent include oleyl alcohol, 1-tetradecanol, 1-dodecanol, and the like.

The first application step S12, the first insulating layer forming step S13, the second application step S14, and the second insulating layer forming step S15 for forming the first insulating layer 31 and the second insulating layer 41B are the same as those in the first embodiment.

When the second insulating layer 41B is formed, a third application step of applying the prepared third coating material around the second insulating layer 41B is performed (S26). Specifically, an operation of applying the third coating material for forming the third insulating layer 51B is performed. The applied coating material formed of the third coating material is formed on the circumferential surface of the second insulating layer 41B.

The third coating material is applied to make the third insulating layer MB have a desired thickness that is about 3 µm, for example, after a third insulating layer forming step subsequently performed. The thickness of the applied coating material is adjusted using a die as in the first application step S12. The die used in the step has a through hole corresponding to the conductor 20 having the second insulating layer 41B formed on the circumferential surface.

Next, the third insulating layer forming step of forming the third insulating layer 51B by heating the applied coating material after the third coating material is applied is performed (S27). Specifically, the applied coating material formed by the application of the third coating material is placed in the furnace maintained within a range from 300° C. to 500° C., as in the first insulating layer forming step.

In the furnace, the solvent is removed, by high temperature, from the applied coating material formed of the third coating material. Thereafter, imidization reaction of the polyamic acid included in the applied coating material proceeds. As a result, the third insulating layer 51B is formed. Volatilization of the high-boiling point solvent occurs at the same time, whereby the third pores 57B are formed in the third insulating layer 51B. That is, the third pores 57B derived from the high-boiling point solvent are formed in the third insulating layer 51B. In other words, the third pores 57B derived from a different foaming agent from the first pores 37 and the second pores 47 are formed in the third insulating layer 51B.

In a portion corresponding to the third outer side region 54B in the third insulating layer 51B in the applied coating material, the high-boiling point solvent vaporized by heating is expected to be released before the polyamic acid turns into polyimide through imidization. Thus, the third outer side region 54B is formed of polyimide, which is an insulating resin, and includes no third pores 57B.

In the portion corresponding to the third inner side region 52B in the applied coating material, the polyamic acid is expected to turn into polyimide through imidization, before the vaporized high-boiling point solvent is released from the applied coating material. Thus, the third inner side region 52B is formed of the polyimide, which is an insulating resin, and the plurality of third pores 57B.

When the third insulating layers 51B are not formed in a layer structure with 13 layers (NO in S28), the process returns to the third application step S26 described above, and the step of forming the third insulating layer 51B is repeated. When the third insulating layers 51B are formed in a layer structure with 13 layers (YES in S28), the process of forming the insulating film 30B around the conductor 20 ends.

The third insulating layer 51B may be formed of an insulating material that is the same as that with which the first insulating layer 31 and the second insulating layer 41B are formed. That is, the third coating material described above may include the polyamic acid that is the same as that included in the first coating material and the second coating material. The adhesion between layers of the insulating film 30B is effectively improved by forming all the layers from the third insulating layer 51B to the first insulating layer 31 with the same insulating material.

Next, a description will be given on comparison in evaluation results between the above-described insulated electrical wire 10B (hereinafter, also referred to as Example 3) and those of Comparative Examples, with reference to FIG. 6.

In the insulated electrical wire 10B of Example 3, the insulating film 30B is formed using two types of coating materials. Thus, it has double coats described in the field of configuration in FIG. 6.

In the field of pore diameter in FIG. 6, the pore diameters (inner layer: 2 µm or less) of the first pores 37 and the second pores 47 of Example 3 are described. In addition, the pore diameter (outer layer: 1 μm or more and 5 μm or less) of the third pores 57B is described.

In the field of adhesion in FIG. 6, evaluation results on the adhesion are described. The insulated electrical wire of Example 3 did not break, and thus the adhesion thereof was evaluated to be good (○).

In the field of porosity of entire film in FIG. 6, a volume percentage (vol %) as an evaluation value of the porosity in the insulating film is described. The porosity in Example 3 is 30 (vol %).

In the field of relative permittivity in FIG. 6, the measured values and the evaluation results of the relative permittivity are described. The value of the relative permittivity in Example 3 was 2.3, and thus determined to be good (○).

In the field of strength of dielectric breakdown in FIG. 6, the measured values and the evaluation results of the strength of dielectric breakdown are described. The value of the strength of dielectric breakdown in Example 3 was 175 (V/μm), and thus determined to be good (○).

With the insulated electrical wire 10B having the configuration described above, by providing the third insulating layer 51B having the third inner side region 52B including the third pores 57B having a larger pore diameter than that of the first pores 37, it is easy to adjust the porosity, the relative permittivity, and the strength of dielectric breakdown of the entire insulating film 30B to desired values as compared with the case where the third insulating layer 51B is not provided.

Third Embodiment

Next, a third embodiment of the present disclosure will be described with reference to FIG. 14 and FIG. 15. The insulated electrical wire of the present embodiment has the same basic configuration as the second embodiment, but is different from the second embodiment in the configuration of the insulating film. Configurations different from those in the second embodiment will be described, and the description of the same configurations will be omitted.

Figure 14:
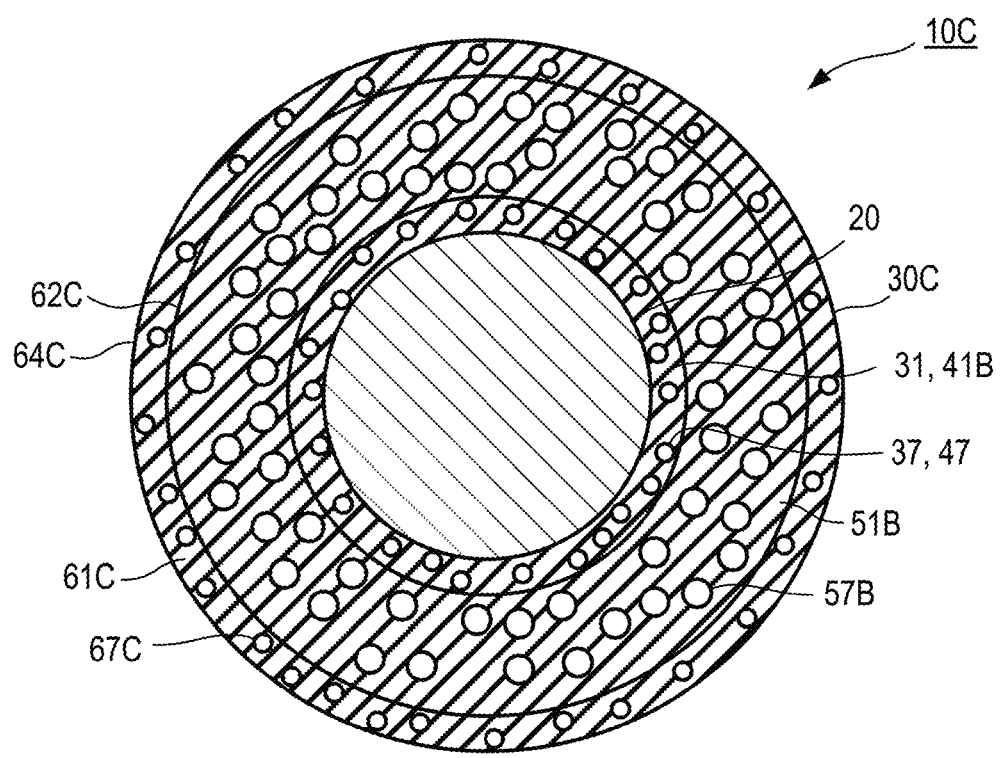
FIG. 14 is a lateral cross-sectional view illustrating a configuration of an insulated electrical wire according to a third embodiment.
Figure 15:
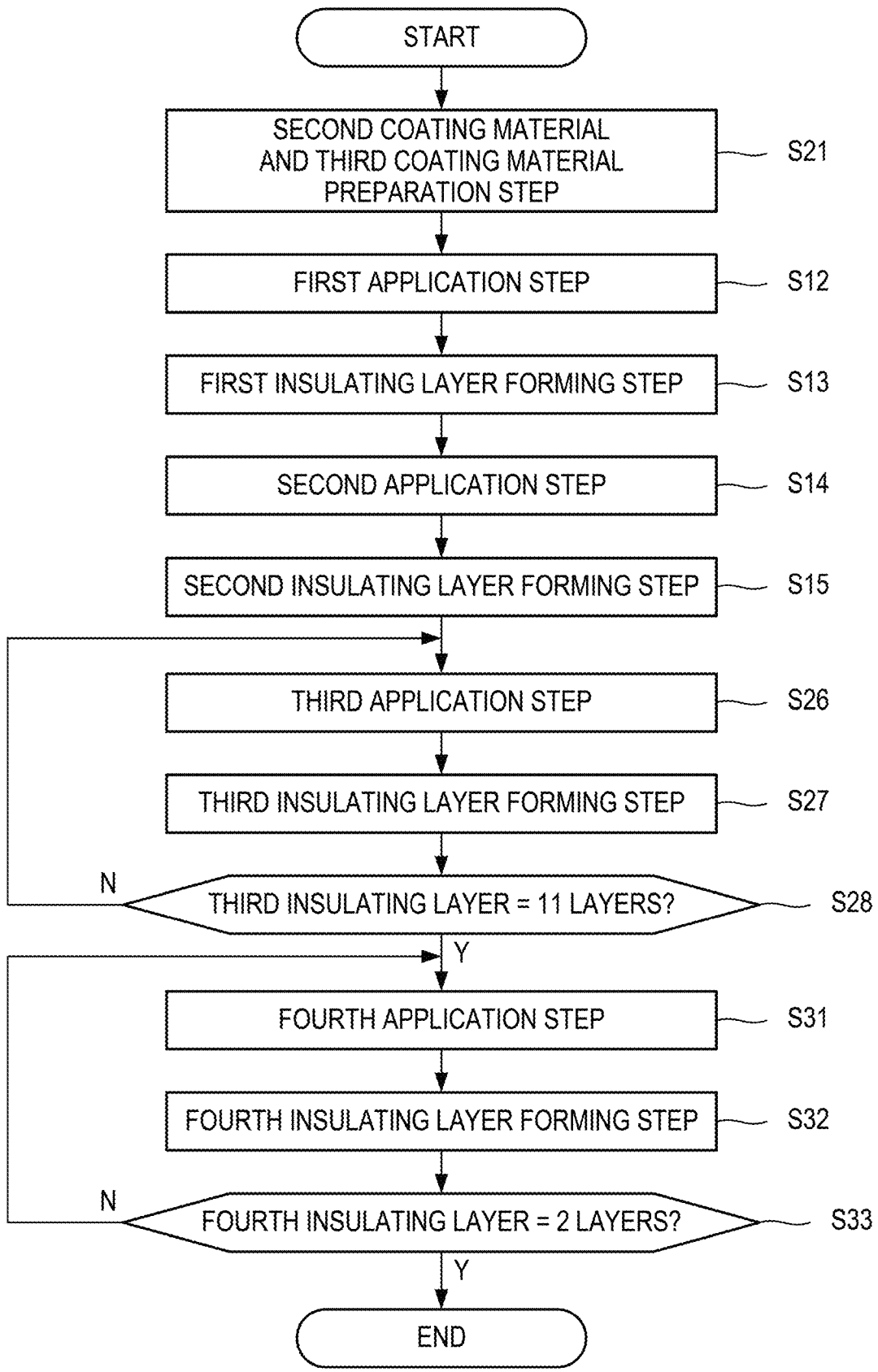
FIG. 15 is a flowchart illustrating a method of manufacturing the insulated electrical wire in FIG. 14.

FIG. 14 is a lateral cross-sectional view illustrating a configuration of an insulated electrical wire 10C of the present embodiment. As illustrated in FIG. 14, the insulated electrical wire 10C is provided with the conductor 20 and an insulating film 30C. The insulating film 30C is a member that covers the circumferential surface of the conductor 20. The insulating film 30C is formed using a material having insulating and thermosetting properties.

For example, the material having insulating and thermosetting properties may be polyimide or polyamideimide. In the example described in the present embodiment, the insulating film 30C is formed of polyimide.

The insulating film 30C is provided with one first insulating layer 31 of Example 2, one second insulating layer 41B, a plurality of third insulating layers 51B, and two fourth insulating layers 61C. In the example described in the present embodiment, 11 third insulating layers 51B are provided. The number of the third insulating layers 51B may be more than or less than 11. The number of the fourth insulating layers 61C may be more than or less than 2.

In the example described in the present embodiment, the insulating film 30C is entirely formed of the 15 insulating layers, and has a thickness of about 40 μm. The thickness of the insulating film 30C may be larger than or smaller than 40 μm. For example, the thickness of the insulating film 30C is 10 μm or more and 200 μm or less.

The fourth insulating layer 61C is a layer that is disposed on the outer circumferential side of the third insulating layer 51B and covers the conductor 20, the first insulating layer 31, the second insulating layer 41B, and the circumference of the third insulating layer 51B. The fourth insulating layer 61C includes a fourth inner side region 62C and a fourth outer side region 64C in this order from the inner side toward the outer side.

The fourth inner side region 62C is a region of the fourth insulating layer 61C on the third insulating layer 51B side, and is formed of polyimide, which is an insulating resin, and a plurality of fourth pores 67C (hereinafter, also referred to as a fourth inner side pore region). The fourth outer side region 64C is a region on the outer side that is opposite to the third insulating layer 51B, and is a region formed of polyimide, which is an insulating resin (hereinafter, also referred to as a fourth outer side pore free region). The pore diameter of each of the fourth pores 67C is 2 μm or less.

Next, a method of manufacturing the insulated electrical wire 10C described above will be described with reference to FIG. 15. Specifically, a method of manufacturing the insulating film 30C in the insulated electrical wire 10C will be described. FIG. 15 is a flowchart illustrating the method of manufacturing the insulated electrical wire 10C.

The process from the second coating material and third coating material preparation step S21 to the second insulating layer forming step S15 is the same as that in the manufacturing method according to the second embodiment, and thus the description thereof will be omitted. Step S28 of determining the number of the third insulating layers 51B formed is different from the second embodiment in that the number of layers is 11.

When 11 third insulating layers 51B are formed (YES in S28), a fourth application step of applying the prepared second coating material around the third insulating layer 51B is performed (S31). Specifically, an operation of applying the second coating material for forming the fourth insulating layers 61C is performed. The applied coating material formed of the second coating material 1 is formed on the circumferential surface of the third insulating layer 51B.

The second coating material is applied to make the fourth insulating layer 61C have a desired thickness that is about 3 μm, for example, after a fourth insulating layer forming step subsequently performed. The thickness of the applied coating material is adjusted using a die as in the first application step S12. The die used in the step has a through hole corresponding to the conductor 20 having the third insulating layer 51B formed on the circumferential surface.

Next, the fourth insulating layer forming step of forming the fourth insulating layer 61C by heating the applied coating material after the second coating material is applied is performed (S32).

Specifically, the applied coating material formed by the application of the second coating material is placed in the furnace maintained within a range from 300° C. to 500° C., as in the first insulating layer forming step.

In the furnace, the solvent is removed, by high temperature, from the applied coating material formed of the second coating material. Thereafter, imidization reaction of the polyamic acid included in the applied coating material proceeds in a state where the polyamic acid and the thermally decomposable polymer are phase-separated. As a result, the fourth insulating layer 61C is formed. Volatilization of the thermally decomposable polymer serving as the foaming agent occurs at the same time, whereby the fourth pores 67C are formed in the fourth insulating layer 61C.

Thus, the fourth pores 67C derived from the liquid thermally decomposable polymer are formed in the fourth insulating layer 61C. In other words, the fourth pores 67C derived from the same foaming agent as the first pores 37 and the second pores 47 are formed in the fourth insulating layer 61C.

In a portion corresponding to the fourth outer side region 64C in the fourth insulating layer 61C in the applied coating material, the thermally decomposable polymer vaporized by heating is expected to be released before the polyamic acid turns into polyimide through imidization. Thus, the fourth outer side region 64C is formed of polyimide, which is an insulating resin, and includes no fourth pores 67C.

In the portion corresponding to the fourth inner side region 62C in the applied coating material, the polyamic acid is expected to turn into polyimide through imidization, before the vaporized thermally decomposable polymer is released from the applied coating material. Thus, the fourth inner side region 62C is formed of the polyimide, which is an insulating resin, and the plurality of fourth pores 67C.

When the fourth insulating layers 61C are not formed in a layer structure with two layers (NO in S33), the process returns to the fourth application step S31 described above, and the step of forming the fourth insulating layer 61C is repeated. When the fourth insulating layers 61C are formed in a layer structure with two layers (YES in S33), the process of forming the insulating film 30C around the conductor 20 ends.

The fourth insulating layers 61C may be formed of an insulating material that is the same as that with which the first insulating layer 31, the second insulating layer 41B, and the third insulating layers 51B are formed. The adhesion between layers of the insulating film 30C is effectively improved by forming all the layers from the fourth insulating layer 61C to the first insulating layer 31 with the same insulating material.

Next, a description will be given on comparison in evaluation results between the above-described insulated electrical wire 10C (hereinafter, also referred to as Example 4) and those of Comparative Examples, with reference to FIG. 6.

The insulated electrical wire 10C of Example 4 includes the first insulating layer 31 and the second insulating layer 41B that are inner layers formed using two types of coating materials, 11 third insulating layers 51B that are intermediate layers, and two fourth insulating layers 61C that are outer layers. Thus, it has triple coats described in the field of configuration in FIG. 6.

In the field of pore diameter in FIG. 6, the pore diameters (inner layer: 2 μm or less) of the first pores 37 and the second pores 47 of Example 4 and the pore diameters (outer layer: 2 μm or less) of the fourth pores 67C are described. In addition, the pore diameter (intermediate layer: 1 μm or more and 5 μm or less) of the third pores 57B is described.

In the field of adhesion in FIG. 6, evaluation results on the adhesion are described. The insulated electrical wire of Example 4 did not break, and thus the adhesion thereof was evaluated to be good (○).

In the field of porosity of entire film in FIG. 6, a volume percentage (vol %) as an evaluation value of the porosity in the insulating film is described. The porosity in Example 4 is 30 (vol %).

In the field of relative permittivity in FIG. 6, the measured values and the evaluation results of the relative permittivity are described. The value of the relative permittivity in Example 4 was 2.3, and thus determined to be good (○).

In the field of strength of dielectric breakdown in FIG. 6, the measured values and the evaluation results of the strength of dielectric breakdown are described. The value of the strength of dielectric breakdown in Example 4 was 190 (V/μm), and thus determined to be good (○).

With the insulated electrical wire 10C having the configuration described above, by providing the fourth insulating layer 61C having the fourth inner side region including the fourth pores 67, it is easy to adjust the porosity, the relative permittivity, and the strength of dielectric breakdown of the entire insulating film 30C to desired values as compared with the case where the fourth insulating layer 61C is not provided.

Note that the technical scope of the present disclosure is not limited to the above-described embodiments, and various modifications can be made without departing from the gist of the present disclosure. For example, the present disclosure is not limited to the above-described embodiments. The present disclosure may be applied to an embodiment in which these embodiments are combined as appropriate, and is not particularly limited.

What is claimed is:

1. An insulated electrical wire comprising:
a conductor; and
an insulating film including pores, wherein
the insulating film at least includes one first insulating layer that is adjacent to the conductor and covers circumference of the conductor,
the first insulating layer includes a first center region, a first inner side region, and a first outer side region,
the first center region is a center region in a thickness direction of the first insulating layer and is formed of an insulating material and first pores that are the pores,
the first inner side region is a region that is closer to the conductor than the first center region in the thickness direction and is formed of an insulating material,
the first outer side region is a region that is opposite to the conductor relative to the first center region in the thickness direction and is formed of an insulating material,
the first pores are derived from a liquid thermally decomposable polymer, and
the first inner side region and the first outer side region are formed not to include the first pores.

2. The insulated electrical wire according to claim 1, wherein a pore diameter of the first pores is 2 μm or less.

3. The insulated electrical wire according to claim 1, wherein
the insulating film further includes at least one second insulating layer that covers circumference of the conductor on an outer circumferential side of the first insulating layer,
the second insulating layer includes a second inner side region and a second outer side region,
the second inner side region is a region on the first insulating layer side in the thickness direction and is formed of an insulating material and second pores that are the pores, and
the second outer side region is a region that is opposite to the first insulating layer in the thickness direction and is formed of an insulating material.

4. The insulated electrical wire according to claim 3, wherein
the insulating film further includes at least one third insulating layer that covers the circumference of the conductor on an outer side of the second insulating layer,
the third insulating layer includes a third inner side region and a third outer side region, the third inner side region is a region on the second insulating layer side in the thickness direction and is formed of an insulating material and third pores that are the pores having a larger pore diameter than the first pores, and the third outer side region is a region that is opposite to the second insulating layer in the thickness direction and is formed of an insulating material.

5. The insulated electrical wire according to claim 4, wherein the insulating film further includes at least one fourth insulating layer that covers the circumference of the conductor on an outer side of the third insulating layer, the fourth insulating layer includes a fourth inner side region and a fourth outer side region, the fourth inner side region is a region on the third insulating layer side in the thickness direction and is formed of an insulating material and the first pores, and the fourth outer side region is a region that is opposite to the third insulating layer in the thickness direction and is formed of an insulating material.

6. The insulated electrical wire according to claim 1, wherein a thickness of each of the first inner side region and the first outer side region in the thickness direction is larger than a pore diameter of the first pores.

7. The insulated electrical wire according to claim 1, wherein the first center region, the first inner side region, and the first outer side region are formed of an identical insulating material.

8. A method of manufacturing an insulated electrical wire, the insulated electrical wire comprising:

a conductor; and an insulating film including pores, the insulating film at least including one first insulating layer that is adjacent to the conductor and covers circumference of the conductor, the first insulating layer including a first center region, a first inner side region, and a first outer side region, the first center region being a center region in a thickness direction of the first insulating layer and is formed of an insulating material and first pores that are the pores, the first inner side region being a region that is closer to the conductor than the first center region in the thickness direction and is formed of an insulating material, the first outer side region being a region that is opposite to the conductor relative to the first center region in the thickness direction and is formed of an insulating material, the first pores being derived from a liquid thermally decomposable polymer, and the first inner side region and the first outer side region being formed not to include the first pores, the method of manufacturing the insulated electrical wire comprising:

a first application step of applying a coating material around a conductor, the coating material containing polyamic acid and a solvent and being obtained by adding a foaming agent composed of a liquid thermally decomposable polymer at a specific part by weight to a resin content of a pre-synthesis coating material and stirring the resulting mixture; and a first insulating layer forming step of forming the first insulating layer including the first center region, the first inner side region, and the first outer side region by heating the coating material applied around the conductor in the first application step to a specific temperature to remove the solvent in the coating material, imidizing the polyamic acid contained in the coating material in a state in which the thermally decomposable polymer and the polyamic acid are phase-separated, and thermally decomposing the thermally decomposable polymer contained in the coating material.

9. The method of manufacturing the insulated electrical wire according to claim 8, wherein the thermally decomposable polymer is a diol type polypropylene glycol.

* * * * *